De W. C. CAREY.

Ruffling Attachments for Sewing-Machines.

No. 5,368. Reissued April 22, 1873.

Witnesses.

John Buckley

W. Bailey

Inventor.

Dewitt C. Carey by atty A. Huck

AM. PHOTO-LITHOGRAPHIC CO. N.Y. (OSBORNE'S PROCESS.)

UNITED STATES PATENT OFFICE.

DE WITT C. CAREY, OF CHICAGO, ILLINOIS, ASSIGNOR TO WM. G. WILSON, OF CLEVELAND, OHIO.

IMPROVEMENT IN RUFFLING ATTACHMENTS FOR SEWING-MACHINES.

Specification forming part of Letters Patent No. 58,376, dated October 2, 1866; reissue No. 5,368, dated April 22, 1873; application filed February 7, 1873.

*To all whom it may concern:*

Be it known that I, DE WITT C. CAREY, formerly of Baltimore, in the county of Baltimore in the State of Maryland, now of Chicago, in the State of Illinois, have invented a new and useful Improvement in Sewing-Machine Attachments for Ruffling or Gathering Fabrics, of which the following is a specification:

The attachment in which this invention is comprised is characterized by the employment of a reciprocatory gathering-blade actuated or deriving its movement from or by the needle arm or bar of the sewing-machine to which the attachment is applied. The attachment as an entirety is adapted to be applied to and removed from the machine at pleasure, and when in position on the machine all its parts are located on or above the cloth-plate. It contains in itself all the elements required to enable it to operate with an ordinary sewing-machine without requiring any change or modification in the construction of such machine; and its moving parts are carried by a frame attachable to the sewing-machine head or some other suitable part of the sewing-machine, as hereinafter stated.

The accompanying drawing represents a gathering and ruffling attachment in which my invention is embodied.

Figure 1:
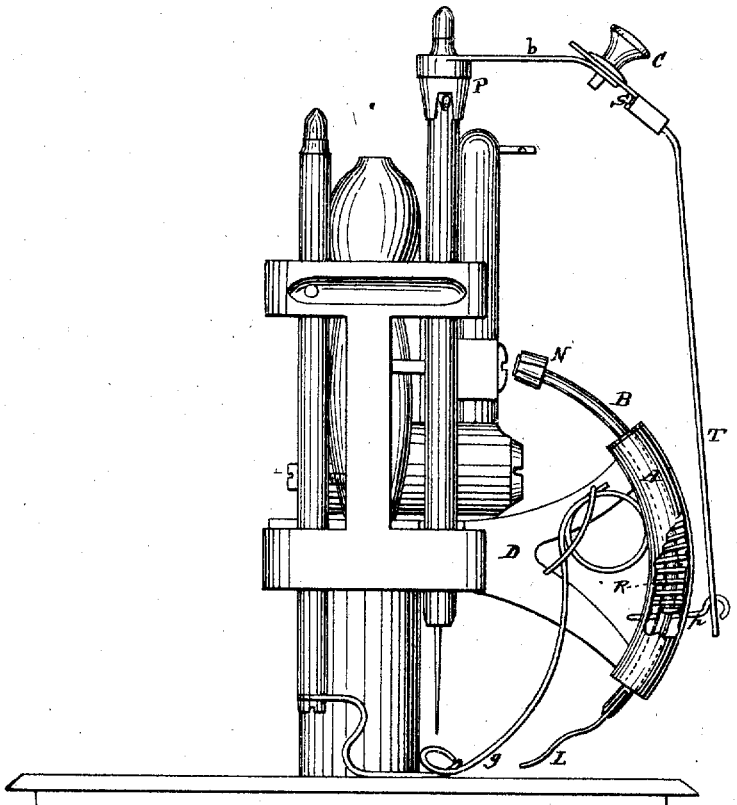
Figure 2:
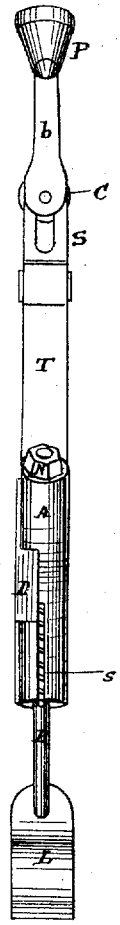
Figure 3:
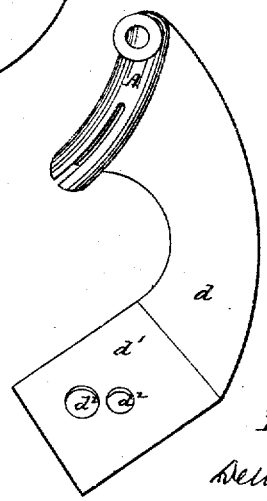

Figure 1 is a front view of a sewing-machine with the attachment in position. Fig. 2 is a side view of the attachment, and Fig. 3 shows the kind of frame used to attach the device to another class of machine.

Similar letters of reference indicate corresponding parts in the several figures.

In the attachment shown all the parts are carried by a frame, D, capable of being applied and secured to and removed from the machine at pleasure. The gathering-blade, consisting of a thin steel plate, L, curved so as to move easily over the sewing-machine cloth-plate, is attached to a bar, B, arranged to slide back and forth within a segmental or curved tube, A, carried by frame D. Within the tube is a spiral spring, R, encircling bar B, and held between the top of the tube and a pin, *p*, on bar B, which works in slots *s* in the tube when the bar B is in motion. On the upper end of the bar which projects above the tube is a nut, N, to prevent the spring when it expands from throwing the bar out and disengaging it from the tube. To the outer end of the pin *p* is hooked or jointed the lower end of a strap, T. The strap T is adapted to be connected with the needle arm or bar of the sewing-machine by means of a cap or thimble, P, designed to fit on the upper end of the needle-bar, which cap or thimble has extending from it a bar, *b*, connected by a clamp-screw, C, with a longitudinally-slotted strip, S, attached to the upper end of strap T. This adjustable connection of the parts *b* and S admits of the size of gather being regulated at pleasure. A spring detent or holder, *g*, is carried by the frame D, and is arranged to bear with a yielding pressure upon the goods which pass beneath it.

When the attachment is in use the gathering-blade, which is of spring metal, and bears upon the goods with a yielding pressure, pushes the gather under the holder, which retains and holds the gather, preventing it from being drawn back when the blade recedes. The goods to be operated on pass beneath the gathering-blade and holder, and under the sewing-machine presser-foot. When the machine is in motion the needle-bar as it rises will, through the intermediary of strap T, retract the gathering-blade into position ready to move forward and make the gather as soon as the bar descends. With the descent of the needle-bar the gathering-blade commences its forward movement, which is caused by the expansion of the spring previously compressed during the rise of the needle bar or arm, and, operating on the goods, will shove a gather forward under the holder *g*, which gather, by the action of the sewing-machine feed, is thence carried forward under the needle, and is then sewed down. In this way a continuous reciprocatory movement is imparted to the gathering-blade, the said movement being derived from the needle arm or bar of the sewing-machine; and by thus deriving the movement of the blade from the needle-bar an attachment is produced which can be applied, as above stated, to any sewing-machine without requiring the machine to be fitted with special mechanism for imparting reciprocatory movement to the gatherer.

The construction and arrangement of the frame D may vary according to the particular kind of sewing-machine for which the attachment is designed. In case the attachment is intended for a Howe or Willcox & Gibbs machine, I prefer to construct and arrange the frame so that it may be attached to the sewing-machine head, as shown in the drawing. A different kind of frame may be used in case the attachment is intended for a Wheeler & Wilson or a Grover & Baker machine, the arrangement being altered so that the frame can be attached to the cloth-plate of the machine, as indicated in Fig. 3, in which *d* is the frame provided with a base-plate, $d^1$, designed to rest on the cloth-plate, and having one or more holes, $d^2$, for passage of the set-screws, by which the frame can be clamped or fastened to the cloth-plate.

What I claim as my invention, and desire to secure by Letters Patent, is—

1. A gathering and ruffling attachment for sewing-machines in which the reciprocatory gathering-blade is actuated from or by the needle arm or bar of the machine, substantially in the manner and by the means shown and described.

2. The combination, substantially as herein described, in a gathering or ruffling attachment for sewing-machines, of a frame adapted to be applied to and removed from the sewing-machine at pleasure, and a reciprocatory gathering-blade arranged to move toward and away from the needle, and actuated from or by the needle arm or bar of the machine by means substantially as and for the purposes set forth.

3. The curved or segmental guide A in the described combination with the bar B carrying a ruffling-plate, L.

4. The spring R, in combination with the curved and segmental guide A, the ruffling-plate L, and bar B, substantially as and for the purposes set forth.

5. The connecting-strap T connected to the head of the needle-bar or other suitable needle-operating mechanism to actuate the ruffling device, substantially as described.

6. In combination with the aforesaid ruffling mechanism A, B, L, and the connecting-strap R, the slotted bar S and clamp-screw C for varying the fineness of the ruffling.

In testimony whereof I have hereunto set my hand before two subscribing witnesses.

DE WITT C. CAREY.

Witnesses:
GEORGE SAWYER,
J. M. DAVIS.